United States Patent
Lee et al.

(10) Patent No.: US 9,302,558 B2
(45) Date of Patent: Apr. 5, 2016

(54) AUXILIARY CARRY DEVICE FOR A BABY STROLLER

(71) Applicants: Tsung-Daw Lee, Taipei (TW); Liang-Jen Fan, Taoyuan County (TW)

(72) Inventors: Tsung-Daw Lee, Taipei (TW); Liang-Jen Fan, Taoyuan County (TW)

(*) Notice: Subject to any disclaimer, the term of this patent is extended or adjusted under 35 U.S.C. 154(b) by 124 days.

(21) Appl. No.: 14/267,924

(22) Filed: May 2, 2014

(65) Prior Publication Data

US 2015/0314660 A1    Nov. 5, 2015

(51) Int. Cl.
*B62B 9/28* (2006.01)
*B60D 1/24* (2006.01)
*B62B 9/12* (2006.01)

(52) U.S. Cl.
CPC . *B60D 1/249* (2013.01); *B62B 9/12* (2013.01); *B62B 9/28* (2013.01)

(58) Field of Classification Search
CPC .................................. B62B 9/28; B62B 5/087
See application file for complete search history.

(56) References Cited

U.S. PATENT DOCUMENTS

| | | | | |
|---|---|---|---|---|
| 6,827,356 B2* | 12/2004 | Zhuang | ..... | B62B 9/28 280/304.1 |
| 7,971,884 B2* | 7/2011 | Lundh | ..... | B62B 9/28 280/32.7 |
| 8,029,007 B2* | 10/2011 | Jones | ..... | B62D 63/00 280/204 |
| 8,146,936 B2* | 4/2012 | Lai | ..... | B62B 5/087 280/202 |
| 8,276,922 B2* | 10/2012 | Lai | ..... | B62B 9/28 280/32.7 |
| 2007/0090619 A1* | 4/2007 | Lundh | ..... | B62B 9/12 280/63 |
| 2008/0088115 A1* | 4/2008 | Yang | ..... | B62B 9/28 280/642 |
| 2015/0084294 A1* | 3/2015 | Clanton | ..... | B62B 9/28 280/32.7 |
| 2015/0266494 A1* | 9/2015 | Weber | ..... | B62B 5/087 280/650 |

FOREIGN PATENT DOCUMENTS

TW   DE 102010016921 A1 * 11/2011   ............... B62B 9/28

\* cited by examiner

*Primary Examiner* — Katy M Ebner
(74) *Attorney, Agent, or Firm* — C. G. Mersereau; Nikolai & Mersereau, P.A.

(57) ABSTRACT

An adjustment device of an auxiliary carry device connected to a baby stroller includes an expanding unit and a folding unit. The folding unit is connected to a board. The expanding unit has two cables, two links and a base. The two cables are connected to the baby stroller, and the two links are connected between the cables and the base connected to the board. The expanding unit makes the two links simultaneously be pivoted away from or toward each other. The folding unit is connected between the board and the expanding unit to pivot the base. The board is pivoted relative to the baby stroller to save space, and the cables provide cushion feature to the board.

6 Claims, 9 Drawing Sheets

AUXILIARY CARRY DEVICE FOR A BABY STROLLER

BACKGROUND OF THE INVENTION (1) Fields of the Invention

The present invention relates to an auxiliary carry device for a baby stroller, and more particularly, to an adjustment device for an auxiliary carry device of a baby stroller.

(2) Descriptions of Related Art

The conventional baby stroller is designed only for carrying one kid. There are also some baby strollers that have two seats for two kids. However, when one kid is able to walk and the other kid needs to be carried in the baby stroller, the two-seat baby stroller may not suitable for the older kid because the older kid wants to have more freedom and does not sit in the seat like the younger kid. The manufacturers develop an auxiliary carry device which is attached to the baby stroller by a link, and the auxiliary carry device is equipped with wheels. The auxiliary carry device cannot be pivoted and adjusted, this makes it difficult for the adult to operate the baby stroller and the auxiliary carry device. The older kid sitting in the seat of the auxiliary carry device does not feel comfortable because no cushion or buffering feature is available. Furthermore, the auxiliary carry device is not foldable so that it occupies a lot of space when not in use.

The present invention intends to provide an adjustment device for auxiliary carry device of a baby stroller, and the adjustment device to eliminate the shortcomings mentioned above.

SUMMARY OF THE INVENTION

The present invention relates to an adjustment device of an auxiliary carry device connected to a baby stroller. The adjustment device comprises an expanding unit and a folding unit. The folding unit is connected to a board. The expanding unit comprises two cables connected to the rear end of the baby stroller, and each of the cables has a connector connected to the distal end thereof. Each connector has a hook. Two links each have a first end connected with the hook of the connector corresponding thereto, and a second end of each of the two links is pivotably connected to a base and has multiple first teeth defined in the curved surface thereof. A block is engaged between the two second ends of the two links, the block has multiple second teeth which are engaged with the first teeth of the two links. The two links are simultaneously pivoted away from or toward each other.

The base has two plates and a tubular portion, wherein the two plates extend from the tubular portion. Each of the two plates has two holes and the two second ends of the two links are pivotably connected between the two plates by extending two pins through the two holes of each of the two plates and the two second ends of the two links. The tubular portion has multiple engaging grooves defined axially in the inner periphery thereof.

The folding unit has two tubes which are fixed to the board. Each of the two tubes has multiple engaging recesses defined therein. The base is connected between the two tubes. Two bolts extend from the two tubes and are connected to the base. Two sleeves each have multiple engaging ribs extending axially from the outside thereof. The two sleeves are located in the two tubular portions. The two bolts extend through the two sleeves and are engaged with the engaging recesses to set the base at a desired angular position. The base is pivotable when the two bolts are disengaged from the engaging recesses.

The cables and the links connected between the board and the baby stroller provide cushion feature to the board so as to reduce impact to the board. The board is pivoted relative to the baby stroller to save space needed when the auxiliary carry device is not in use.

The adjustment device of the present invention is suitable for any type of baby stroller.

The adjustment device of the present invention provides the expanding unit which eliminates the effect from component forces in different directions so that the adult can easily move the baby stroller.

The base is foldable to reduce the storage space needed.

The board of the auxiliary carry device provides a flat board for an older kid to stand. A seat can be installed to the board for a kid to sit therein.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
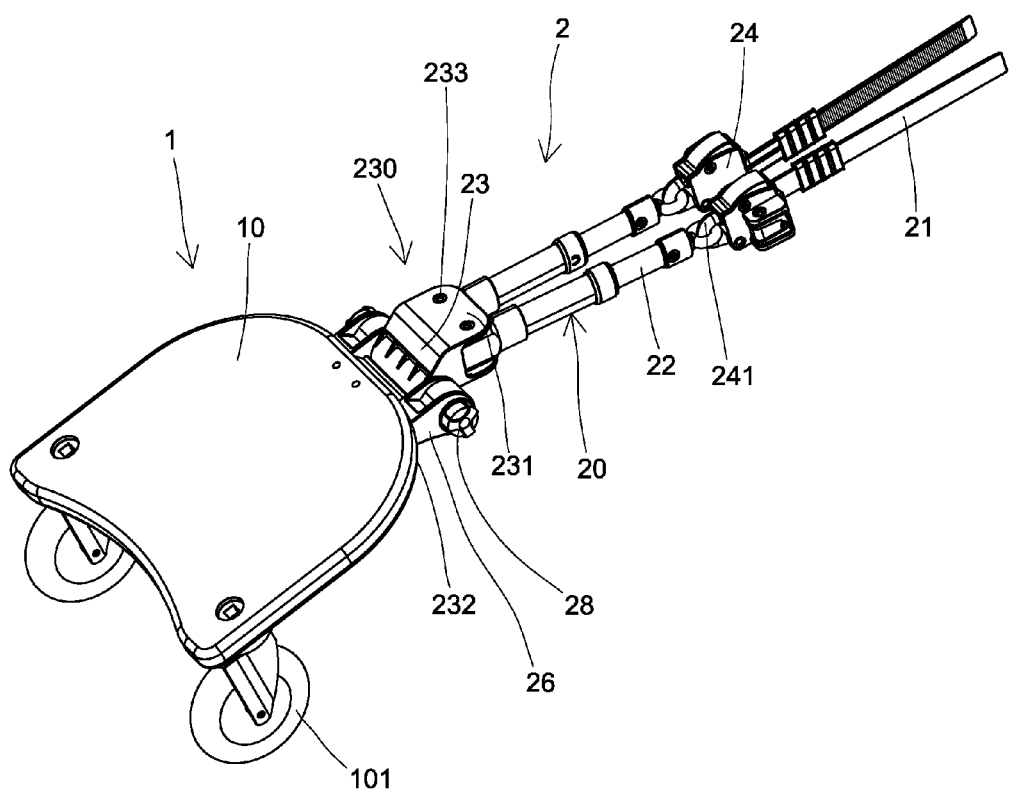
FIG. 1 is a perspective view to show the auxiliary carry device of the present invention.
Figure 2:
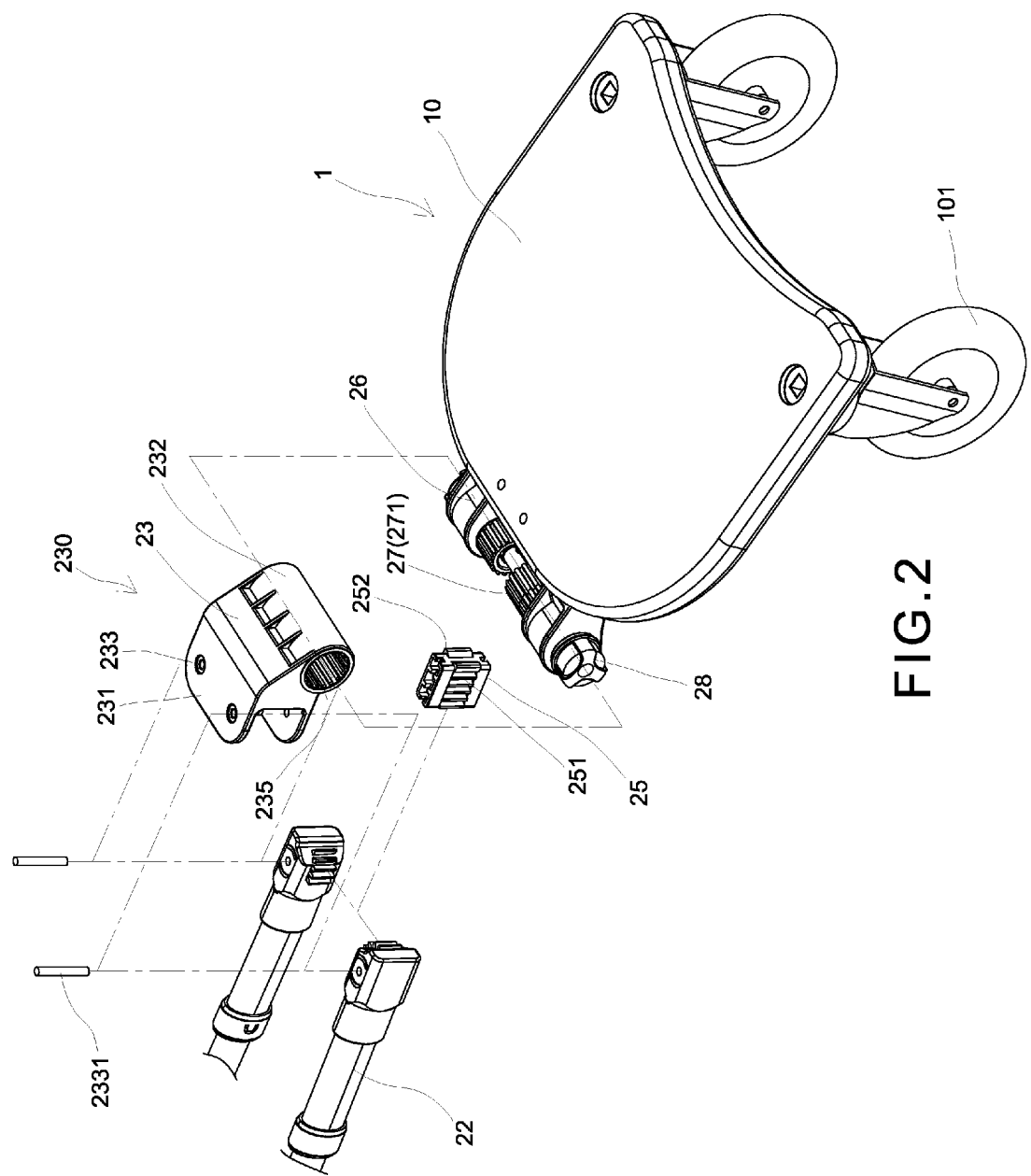
FIG. 2 is an exploded view of a portion of the auxiliary carry device of the present invention.
Figure 3:
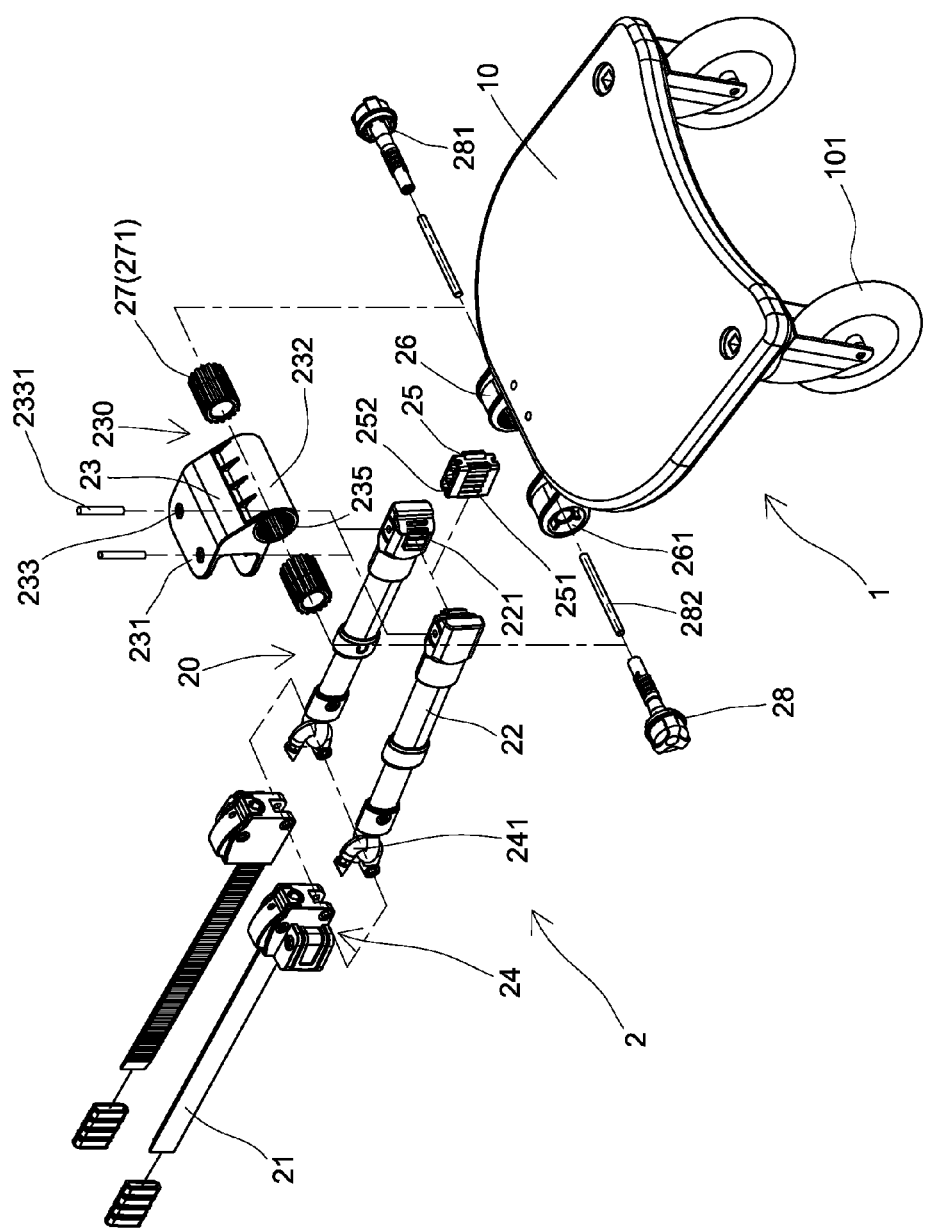
FIG. 3 is an exploded view of the adjustment device of the auxiliary carry device of the present invention.
Figure 4:
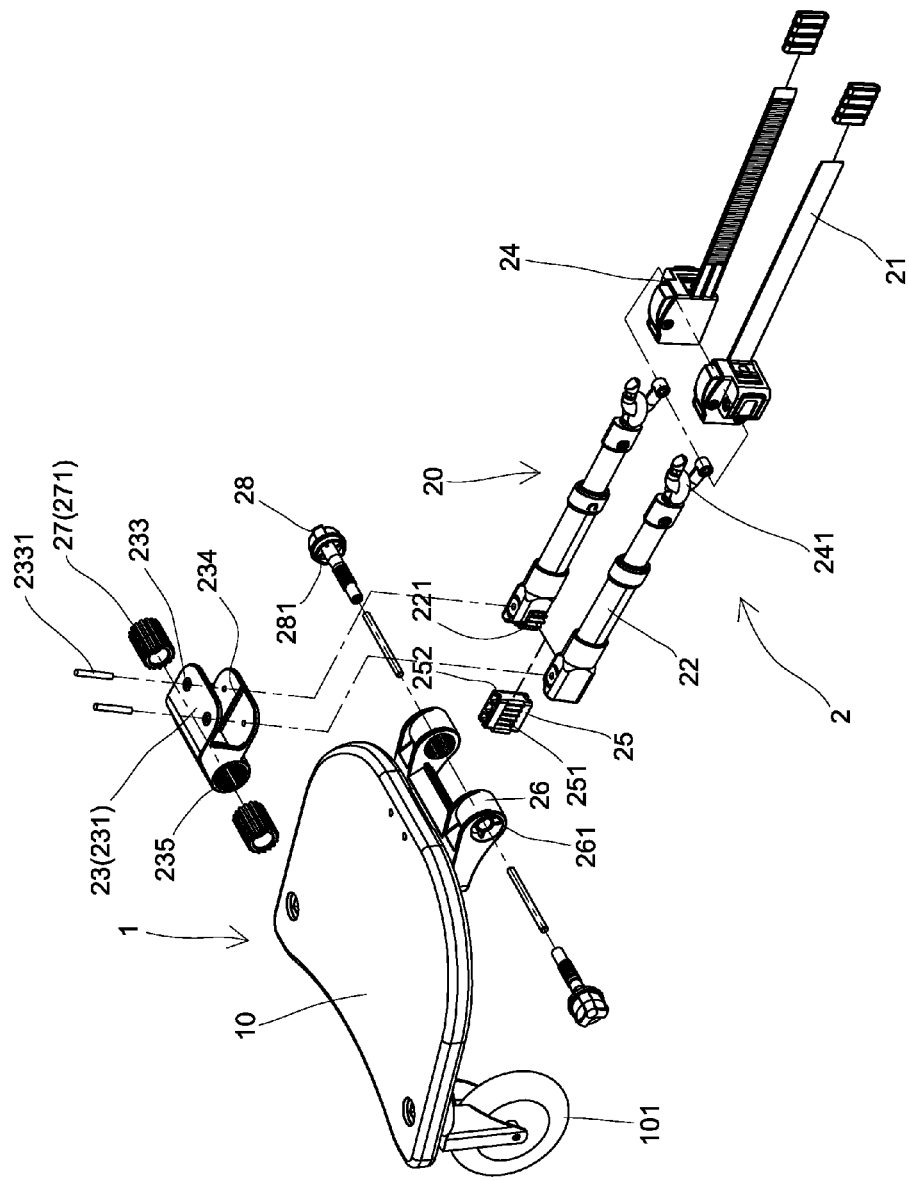
FIG. 4 is another angle of the exploded view shown in FIG. 3.

Referring to FIGS. 1 to 5, the adjustment device 2 of an auxiliary carry device 1 of the present invention comprises an expanding unit 20 and a folding unit 230. The auxiliary carry device 1 is a board 10 and the folding unit 230 is connected to the board 10. The expanding unit 20 comprises two cables 21 connected to the rear end of the baby stroller, and each of the cables 21 has a connector 24 connected to the distal end thereof. The length of each of the cables 21 is adjusted by the connector 24. Each connector 24 has a hook 241. Two links 22 each have the first end connected with the hook 241 of the connector 24 corresponding thereto. The second end of each of the two links 22 is pivotably connected to a base 23 and has multiple first teeth 221 defined in the curved surface thereof. A block 25 is engaged between the two second ends of the two links 22. The block 25 has multiple second teeth 251 which are engaged with the first teeth 221 of the two links 22. When either of the two links 22 is pivoted outward or inward, the other link 22 is simultaneously pivoted the same action. The block 25 has a groove 252 defined in each of the top and the bottom thereof.

The base 23 has two plates 231 and a tubular portion 232, wherein the two plates 231 extend from the tubular portion 232. Each of the two plates 231 has two holes 233 and the two second ends of the two links 22 are pivotably connected between the two plates 231 by extending two pins 2331 through the two holes 233 of each of the two plates 231 and the two second ends of the two links 22. The tubular portion 232 has multiple engaging grooves 235 defined axially in the inner periphery thereof. Each of the two plates 231 of the base 23 has a ridge 234 extending from the inside thereof. The two ridges 234 are engaged with the two grooves 252, so that the block 25 is movable between the two plates 231 of the base 23.

The folding unit 230 has two tubes 26 which are fixed to the board 10. Each of the two tubes 26 has multiple engaging recesses 261 defined therein. The base 23 is connected between the two tubes 26. Two bolts 28 extend from the two tubes 26 and are connected to the base 23. Each of the two bolts 28 has an axle 282 inserted therein. Two sleeves 27 each have multiple engaging ribs 271 extending axially from the outside thereof. The two sleeves 27 are located in the tubular portion 232. The engaging ribs 271 are engaged with the engaging grooves 235 to position the sleeves 27 in the tubular portion 232. Each of the two bolts 28 has a stop member 281 extending from a shank thereof. The two bolts 28 extend through the two sleeves 27 and the stop members 281 are respectively engaged with the engaging recesses 261 of the tubes 26 to set the base 23 at a desired angular position. The base 23 is pivotable when the two bolts 28 are disengaged from the engaging recesses 261 as shown in FIG. 6.

Figure 5:
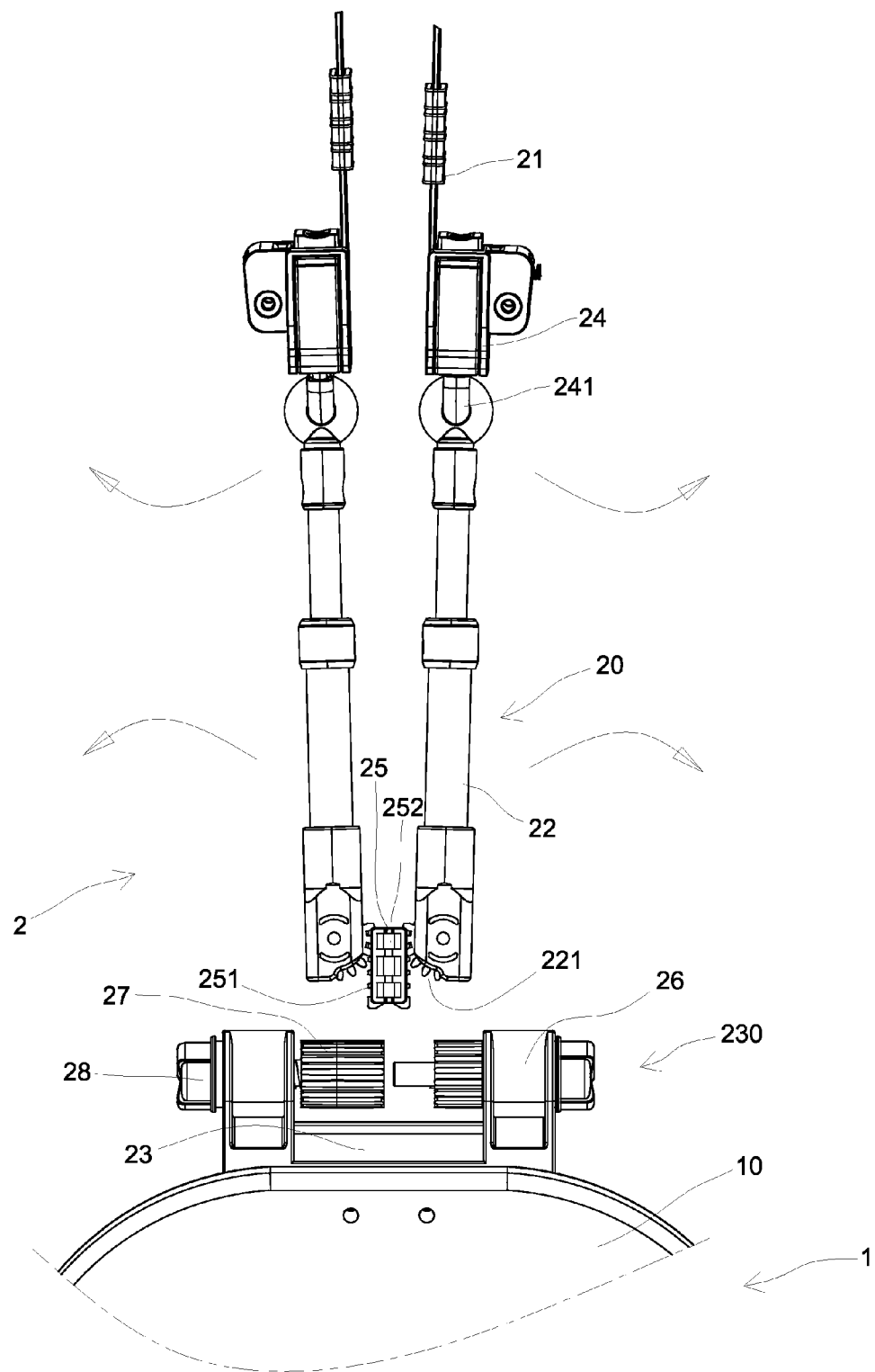
FIG. 5 shows that the two links are to be connected to the base on the board of the auxiliary carry device of the present invention.

As shown in FIG. 5, when a compression force or a pulling force is applied between the baby stroller and the auxiliary carry device 1, one of the two links 22 is pivoted outward or inward as shown by the arrow heads of FIG. 5, the other link 22 is simultaneously pivoted the same. The first teeth 221 of the links 22 moves along the second teeth 251 of the block 25, so that the block 25 moves along the ridges 234 of the two plates 231 of the base 23 to reduce the effect from the component forces in different directions. The links 22 simultaneously move to provide a buffering feature to avoid a hard impact between the baby stroller and the auxiliary carry device 1.

Figure 6:
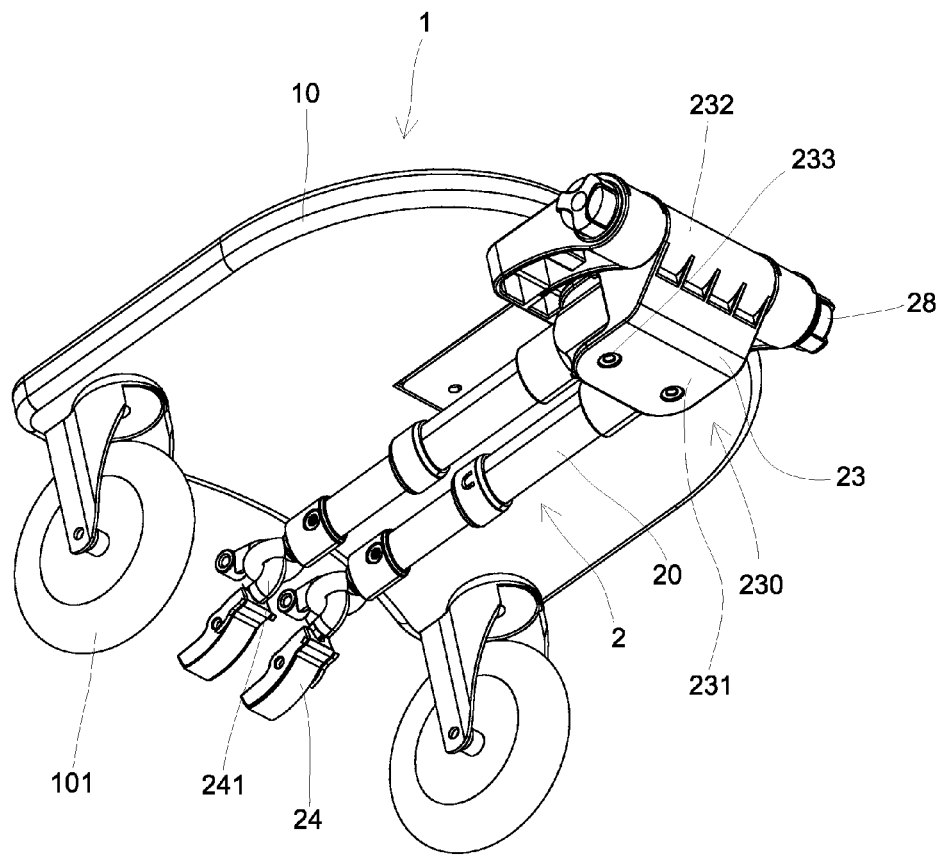
FIG. 6 shows that the board is pivoted toward the two links.

When unscrewing the two bolts 28 of the folding unit 230, the two bolts 28 are no longer engaged with the engaging recesses 261 of the tubes 26, so that the base 23 is pivoted to reduce the storage space needed as shown in FIG. 6.

Figure 7:
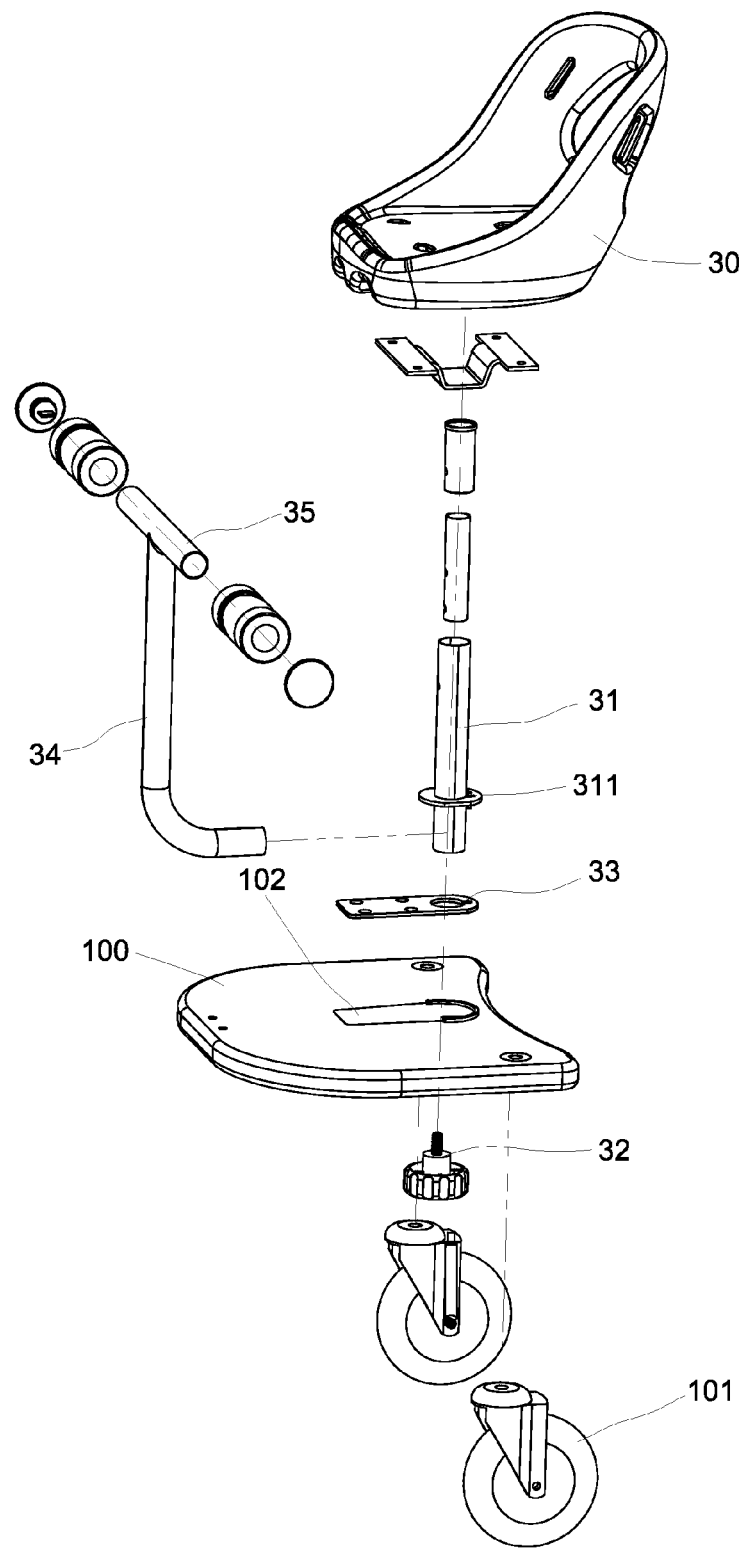
FIG. 7 is an exploded view to show the board and the seat of the present invention.
Figure 8:
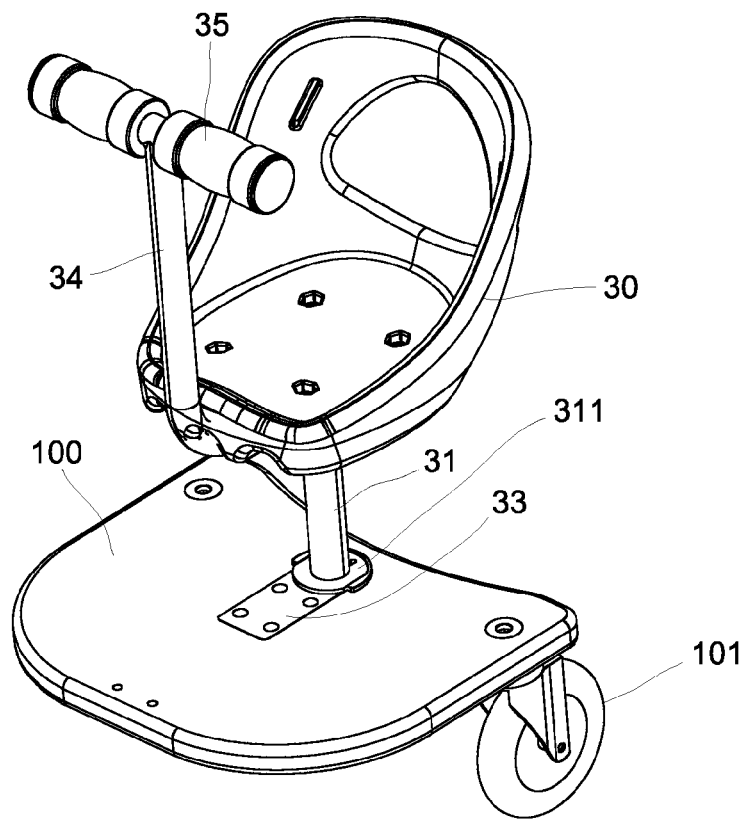
FIG. 8 is a perspective view to show that the seat is connected to the board of the present invention.
Figure 9:
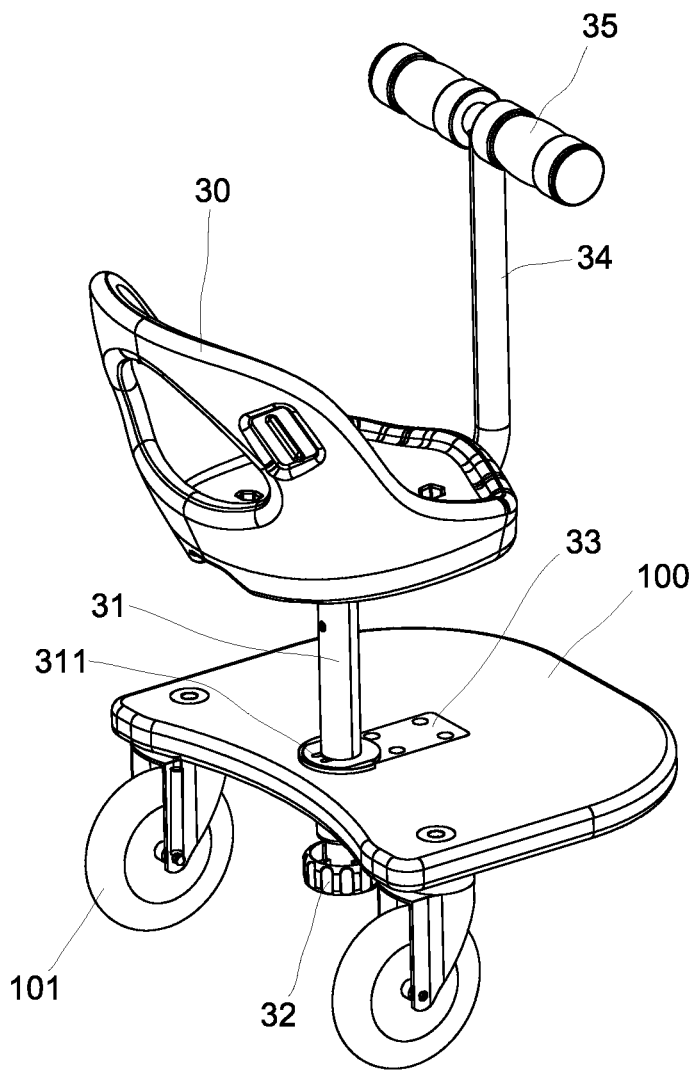
FIG. 9 is another perspective view to show that the seat is connected to the board of the present invention.

As shown in FIGS. 7 to 9, the board 100 has an installation hole 102 defined therethrough. A seat 30 has a post 31 extending from the underside thereof, the post 31 is a retractable post and extends through the a securing plate 33 and the installation hole 102 of the board 100, and is connected with a locking bolt 32. A flange 311 extends radially from the post 31 and is securely rested on the securing plate 33. Two wheels 101 are connected to the underside of the board 100. An L-shaped tube 34 is connected to the underside of the seat 30 and a handle 35 is connected to the L-shaped tube 34. The kid sitting in the seat 30 can hold the handle 35.

The expanding unit 20 of the adjustment device 2 provide a buffering feature by pivoting the two links 22 outward or inward to avoid hard impact between the baby stroller and the auxiliary carry device 1.

The two cables 21 are connected to the rear end of the baby stroller so that the present invention can be used on any type of baby strollers.

The block 25 moves along the ridges 234 of the two plates 231 of the base 23 to reduce the effect from the component forces in different directions. Therefore, the adult can easily operate the baby stroller.

The base 23 of the folding unit 230 can be folded to reduce the storage space required. The older kid can stand on the board 10 or sits in the seat 30 on the board 100.

While we have shown and described the embodiment in accordance with the present invention, it should be clear to those skilled in the art that further embodiments may be made without departing from the scope of the present invention.

What is claimed is:

1. An adjustment device of an auxiliary carry device that is connected to a baby stroller, the adjustment device comprising:
   an expanding unit and a folding unit, the folding unit connected to a board;
   the expanding unit having two cables which are adapted to be connected to a rear end of the baby stroller, each of the cables having a connector connected to a distal end thereof, each connector having a hook;
   two links each have a first end connected with the hook of the connector corresponding thereto, a second end of each of the two links pivotably connected to a base and having multiple first teeth defined in a curved surface thereof, a block engaged between the two second ends of the two links, the block having multiple second teeth which are engaged with the first teeth of the two links, such that the two links are simultaneously pivoted away from or toward each other;
   the base having two plates and a tubular portion, the two plates extending from the tubular portion, each of the two plates having two holes and the two second ends of the two links pivotably connected between the two plates by extending two pins through the two holes of each of the two plates and the two second ends of the two links, the tubular portion having multiple engaging grooves defined axially in an inner periphery thereof;
   the folding unit having two tubes which are fixed to the board, each of the two tubes having multiple engaging recesses defined therein, the base connected between the two tubes, two bolts extending from the two tubes and connected to the base, and
   two sleeves each having multiple engaging ribs extending axially from an outside thereof, the two sleeves located in the tubular portion, the two bolts extending through the two sleeves and engaged with the engaging recesses to set the base at a desired angular position, the base being pivotable when the two bolts are disengaged from the engaging recesses.

2. The adjustment device as claimed in claim 1, wherein each of the two plates of the base has a ridge extending from an inside thereof, the block has a groove defined in each of a top and a bottom thereof, the two ridges are engaged with the two grooves, the block is movable between the two plates of the base.

3. The adjustment device as claimed in claim 1, wherein each of the two bolts has a stop member extending from a shank thereof, the stop members are respectively engaged with the engaging recesses of the tubes.

4. The adjustment device as claimed in claim 1, wherein each of the two bolts has an axle inserted therein.

5. The adjustment device as claimed in claim 1, wherein the board has an installation hole defined therethrough, a seat has a post extending from an underside thereof, the post extends through a securing plate and the installation hole of the board and is connected with a locking bolt, a flange extends radially from the post and is securely rested on the securing plate.

6. The adjustment device as claimed in claim 5, wherein an L-shaped tube is connected to the underside of the seat and a handle is connected to the L-shaped tube.

* * * * *